United States Patent
Tacker

(10) Patent No.: US 6,966,410 B1
(45) Date of Patent: Nov. 22, 2005

(54) ARRANGEMENT AND METHOD FOR AUTOMATICALLY DISENGAGING A MANUAL OPERATOR FOR AN ELECTRIC PARKING BRAKE

(75) Inventor: William R. Tacker, Troy, MI (US)

(73) Assignee: Dura Global Technologies, Inc., Rochester, MI (US)

( * ) Notice: Subject to any disclaimer, the term of this patent is extended or adjusted under 35 U.S.C. 154(b) by 214 days.

(21) Appl. No.: 10/369,346

(22) Filed: Feb. 17, 2003

(51) Int. Cl.⁷ ............................................. F16D 55/08
(52) U.S. Cl. ..................................... 188/2 D; 188/72.1
(58) Field of Search .............................. 188/2 D, 170, 188/171, 72.1, 72.3, 156, 161–163, 173

(56) References Cited

U.S. PATENT DOCUMENTS

| 4,033,435 | A | | 7/1977 | Bayliss |
| 5,180,038 | A | * | 1/1993 | Arnold et al. ............... 188/171 |
| 5,348,123 | A | | 9/1994 | Takahashi et al. |
| 5,542,513 | A | * | 8/1996 | Reyes ....................... 192/219.4 |
| 6,386,338 | B1 | | 5/2002 | Powrozek |
| 6,561,321 | B1 | * | 5/2003 | Klode et al. ................ 188/72.1 |
| 6,698,555 | B2 | * | 3/2004 | Schafer et al. .............. 188/170 |

FOREIGN PATENT DOCUMENTS

| DE | 41 29 934 A1 | 3/1993 |
| EP | 1 211 150 A2 | 6/2002 |

* cited by examiner

*Primary Examiner*—Robert A. Siconolfi
*Assistant Examiner*—Melanie Torres
(74) *Attorney, Agent, or Firm*—John R. Benefiel

(57) ABSTRACT

A parking brake operated by an electric motor has a manual operator including a flexible cable core drivable with a tool to allow drive gearing driven by the electric motor, but which is disengaged from a driving connection to the gearing whenever the motor is energized by also energizing solenoid shifting a coupling to a disconnected position.

8 Claims, 2 Drawing Sheets

ARRANGEMENT AND METHOD FOR AUTOMATICALLY DISENGAGING A MANUAL OPERATOR FOR AN ELECTRIC PARKING BRAKE

BACKGROUND OF THE INVENTION

This invention concerns electrically operated parking brakes, in which an electric motor is selectively energized as by depressing a switch to operate the parking brake so as to be released or engaged.

U.S. Pat. No. 6,386,338 assigned to the same assignee as the present application describes an arrangement for electrically operating a parking brake, with an alternative manual operator and that patent is incorporated herein by reference.

In the alternative manual operation, one end of an inner core of a flexible Bowden type cable is engaged with a hand tool to enable the cable to be rotated, causing a spur gear connected to the other end of the core, which in turn drives gearing connected to a screw shaft, able to also be driven by an electric-motor. This causes advance of a nut on the screw shaft. A second flexible cable core is attached at one end to the nut and at the other end to the parking brake, to either set or release the brake by rotation of the screw shaft in respective directions, either manually as described or by selective energization of the electric motor. In order to avoid rotation of the flexible cable core that is used to manually operate the brake during electric operation, an arrangement is provided to mechanically uncouple the flex cable core from the gear used to drive the screw shaft except when a tool is operatively engaged with the other end of the flexible cable core. This arrangement is mechanically complex and requires an additional effort by the person manually operating the parking brake.

It is the object of the present invention to provide a simplified arrangement and method for uncoupling an alternative manual operator for an electrically operated parking brake which does not entail an extra effort by the user when the parking brake is operated manually.

The above recited object and other objects of the invention which will become apparent upon a reading of the following specification and claims are achieved by providing a slidable coupling which is spring urged to drivingly connect one end of a flex cable core with a gear engaged with the parking brake gearing normally driven by an electrical motor. The flex cable extends to a tool drive fitting located on the vehicle to be conveniently accessible for manual operation of the parking brake. A solenoid causes shifting of the coupling so as to disconnect the flex cable core from the associated gear whenever the electric motor is energized so that the flex cable is not driven when the parking brake is being electrically operated.

DETAILED DESCRIPTION

Figure 1:
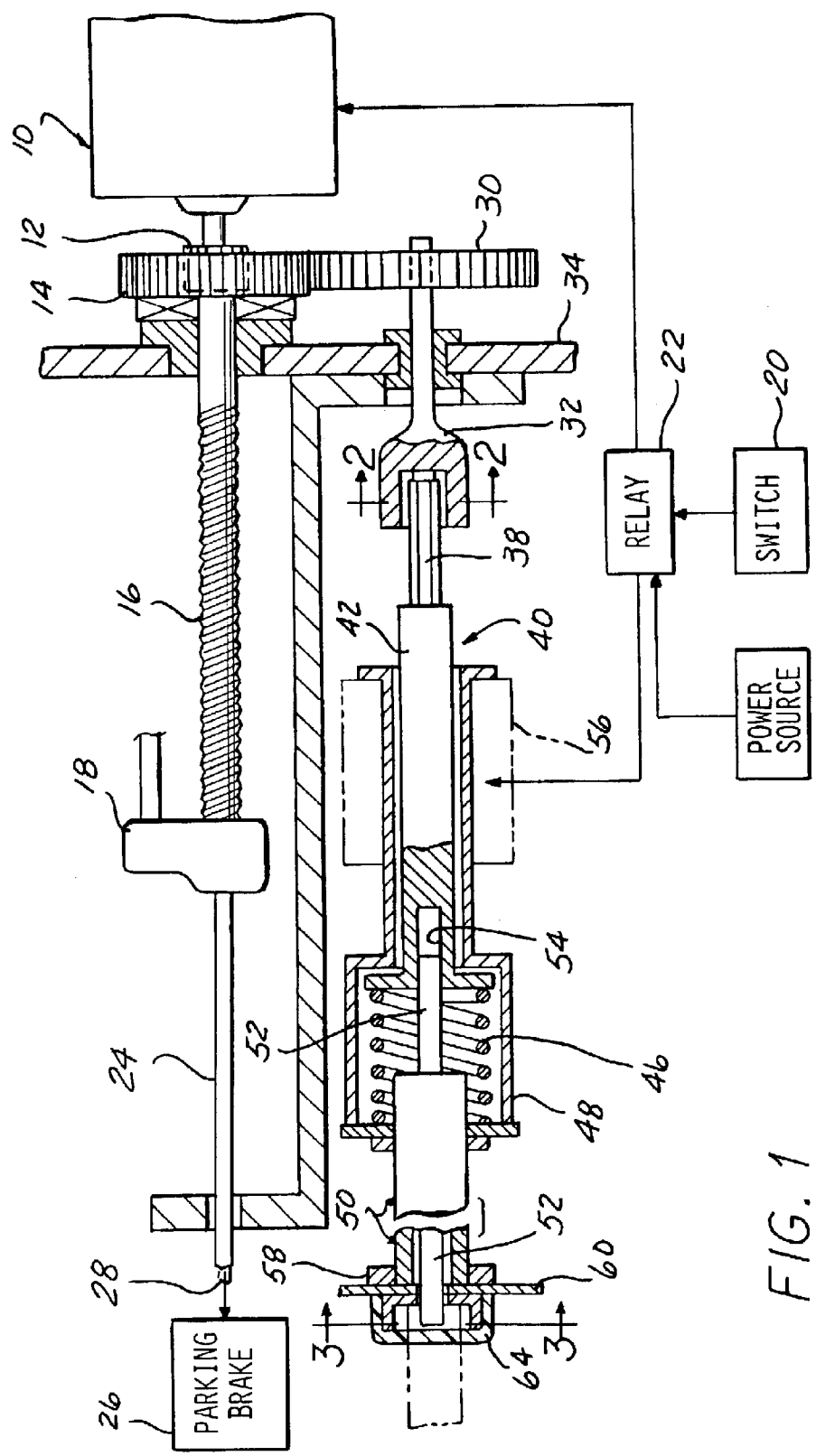
FIG. 1 is a partially sectional view of manual operator components for an electrically powered parking brake also shown in fragmentary form with certain components depicted diagrammatically.
Figure 1A:
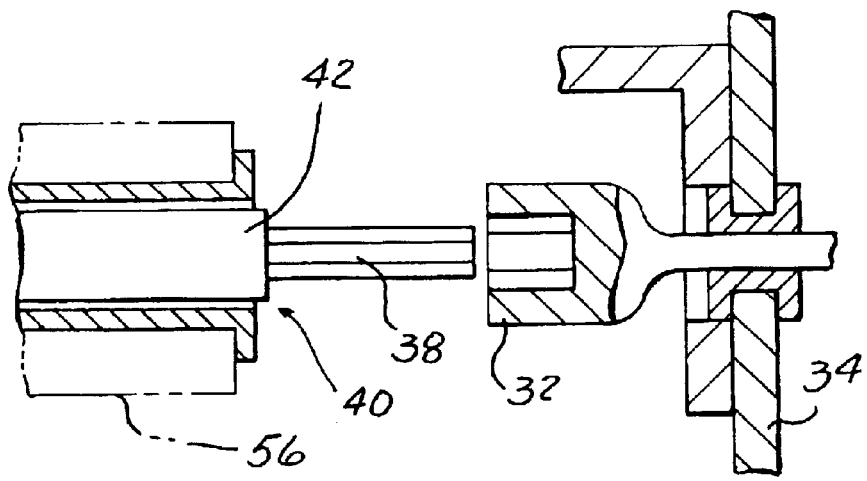
FIG. 1A is the same view as FIG. 1 but with the manual operator components shifted to a disconnected condition.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, the present invention concerns an electric parking brake, in which a reversible electric motor 10 drives gearing including an output shaft pinion gear 12 engaged with a spur gear 14 affixed to the lead screw 16. A nut assembly 18 is received on the lead screw 16 and traverses along the length thereof in either direction when the motor 10 is energized as by operation of a switch 20 and relay 22 to rotate the lead screw 16 in either direction. A flex cable 24 is secured to the nut assembly 18 to set or release the parking brake 20 by movement of the flex cable core 28. This arrangement is described in U.S. Pat. No. 6,386,338 referenced above.

The screw 16 has low angle irreversible threads formed thereon so that the brake 26 will remain in any set position until released.

Figure 2:
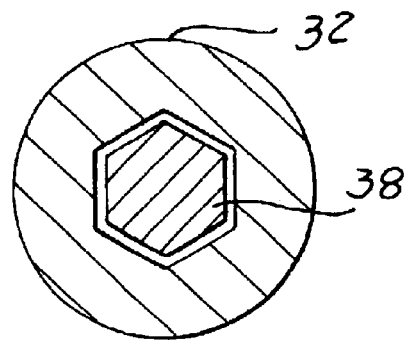
FIG. 2 is an enlarged view of the section 2—2 taken in FIG. 1.
Figure 3:
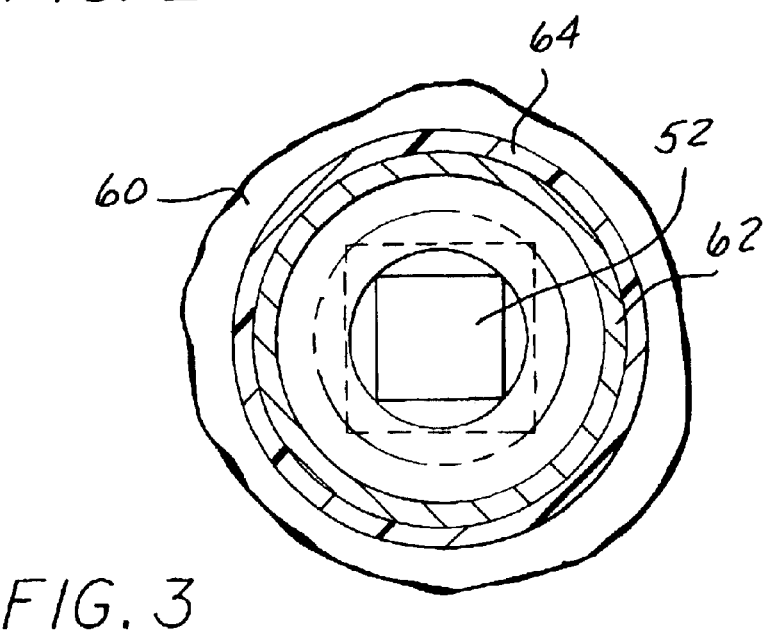
FIG. 3 is an enlarged view of the section 3—3 taken in FIG. 1.

The manual operator includes a drive gear 30 fixed to a shaft 32 rotatable in a bracket 34. A drive socket 36 is at the free end of the shaft 32 and configured to mate with a driving element 38 of a coupler 40. The cross section shape of element 38 and socket 36 are complementary and do not allow relative rotation (see the illustrative hex shape in FIG. 2) so that a rotational driving connection is established when driver element 38 is received in socket 36.

The coupler 40 includes a cylindrical portion 42 slidable in a sleeve 44, surrounded by a solenoid 56 (shown in phantom lines). The coupler 40 is normally urged to the right as seen in FIG. 1 to mate with the socket 36 by a spring 46 disposed within a fitting 48 and engaging one end of the coupler 40.

The fitting 48 clamps one end of a flex cable 50 to position a core 52 within a recess 54 in the end of the coupling 40 opposite the driver element 38.

The flex cable 50 extends to a convenient location as within the passenger compartment and has an end mounted by a fitting 58 to a trim panel 60. The square core 52 is exposed within a trim ring 62 which may be covered with a removable cap 64.

The solenoid 56 is energized whenever the motor 10 is energized by an electrical connection to the relay 22 so that the coupling 40 is driven to the left to disengage the driver element 38 from the shaft recess 36. Thus, the core 52 is not rotated whenever the motor 10 is operating the parking brake 26 but is engaged at all other times to allow manual operation by a tool fit to the end of the core 52 in the trim ring 62.

No effort is required by the operator to engage the manual operator when manual operation is begun.

This also is a simpler and more reliable arrangement for disengaging the manual operator when the motor 10 is energized.

I claim:

1. An arrangement for automatically disengaging a manual operator for an electrical parking brake for an automotive vehicle, said parking brake operated by an electric motor, gearing driven in either direction by said electric motor, and a mechanism responsive to driving of said gearing causing setting or releasing of said brake, said manual operator including manual operator gearing engaged with said electric motor driven gearing, and a flex cable having one end positioned to allow a flex cable core to be rotated by a manual tool, and another end drivingly connectable to said manual operator gearing, said arrangement for automatically disengaging said manual operator including a movable coupling interposed between said manual operator gearing and said another end of said flexible cable core;

said coupling having one drive feature drivingly connectable to said another end of said flexible cable core, and another drive feature drivingly connectable to said manual operator gearing, said another end of said flexible cable core having a rotational driving connection with said manual operator gearing only when both said coupling features are drivingly connected to said another end of said flexible cable core and manual operator gearing respectively;

said coupling being shiftable from a normal position whereat both said features are drivingly connected to a position whereat both of said features are not connected;

a solenoid positioned adjacent said coupling to cause shifting movement away from said normal position whereat said coupling features are both engaged upon energization of said solenoid to disconnect at least one of said coupling features; and a solenoid power circuit energizing said solenoid only when said electric motor is energized, whereby said flexible cable core is disconnected from said manual operator gearing whenever said electric drive is energized.

2. The arrangement according to claim 1 wherein said biasing element comprises a compression spring engaging one end of said coupling.

3. The arrangement according to claim 1 wherein said coupling feature engaged with said manual operating gearing is disengaged by shifting of said coupling away from said normal position.

4. The arrangement according to claim 1 wherein said manual operator gearing comprises a gear engaged with said electric motor gearing and a gear shaft connected at one end to said gear and extending towards said coupling, said shaft having a recess formed in an opposite end thereof from said gear; said coupling having a drive element aligned with said recess and received therein with said coupling in said normal position, said coupling element configured to establish a rotary drive connection to said shaft when received in said recess.

5. A method for enabling manual operation of a parking brake which is normally operated by an electric motor and gearing associated therewith comprising the steps of:

establishing a rotational driving connection between one end of a flex cable core and said gearing;

disposing an opposite end of said flex cable core to be engageable with a hand tool so as to be rotatable and thereby drive said electric motor gearing to operate said parking brake;

disconnecting said driving connection between said flex cable and said electric motor gearing whenever said electric motor is energized whereby said flexible cable core is not rotated by energization of said electric motor.

6. The method according to claim 5 wherein said step of disconnecting said driving connection between said flexible core and said electric motor gearing includes the step of disposing a coupling between said flexible cable core and said electric motor gearing which drivingly connects said core to said gearing in one position and drivingly disconnects said driving connection in another position and further including the step of shifting said coupling to said another position whenever said electric motor is energized.

7. The method according to claim 6 wherein said step of disconnecting said driving connection further includes energizing a solenoid positioned to shift said coupling to said another position whenever said electric motor is energized.

8. The method according to claim 7 further including the step of urging said coupling towards said one position.

* * * * *